United States Patent [19]

Saxena et al.

[11] Patent Number: 5,795,147
[45] Date of Patent: Aug. 18, 1998

[54] FURNACE HAVING REGULATED FLOW RATE OF INERTING GAS

[75] Inventors: Neeraj Saxena, Murray Hill, N.J.; Colin John Precious, Rotherham; Paul Francis Stratton, Bradley Huddersfield, both of England

[73] Assignee: The BOC Group, Inc., New Providence, N.J.

[21] Appl. No.: 661,679

[22] Filed: Jun. 11, 1996

Related U.S. Application Data

[63] Continuation-in-part of Ser. No. 563,145, Nov. 27, 1995, abandoned.

[51] Int. Cl.$^6$ .................................................. F27B 5/04
[52] U.S. Cl. ....................................... 432/205; 432/47
[58] Field of Search ................................. 432/2, 23, 41, 432/47, 137, 138, 205

[56] References Cited

U.S. PATENT DOCUMENTS 4,551,091  11/1985  Paterson ............................. 432/23
4,920,998  5/1990  Deitrick et al. ..................... 432/23
5,252,860  10/1993  McCarty et al. .................. 60/39.03

*Primary Examiner*—Henry A. Bennett
*Assistant Examiner*—Gregory Wilson
*Attorney, Agent, or Firm*—David M. Rosenblum; Salvatore P. Pace

[57] ABSTRACT

A furnace, for instance a reflow soldering oven, in which oxygen concentration is either directly or inferentially sensed within central processing and either one or both of the inlet and outlet sections of the furnace. Signals generated by these sensors are processed in a PID controller to generate a control signal to control the flow rate of inerting gas into the central processing section, thereby to at least inhibit ingress of air into the central processing section. The PID controller is programmed such that its integral error term is set equal to a time average of the oxygen concentrations of the central processing section less an oxygen concentration set point desired for the central processing section. The proportional and differential error terms are set equal to a time average of the concentrations of the central processing section and one or both of the inlet and outlet sections of the furnace less the oxygen concentration set point.

8 Claims, 1 Drawing Sheet

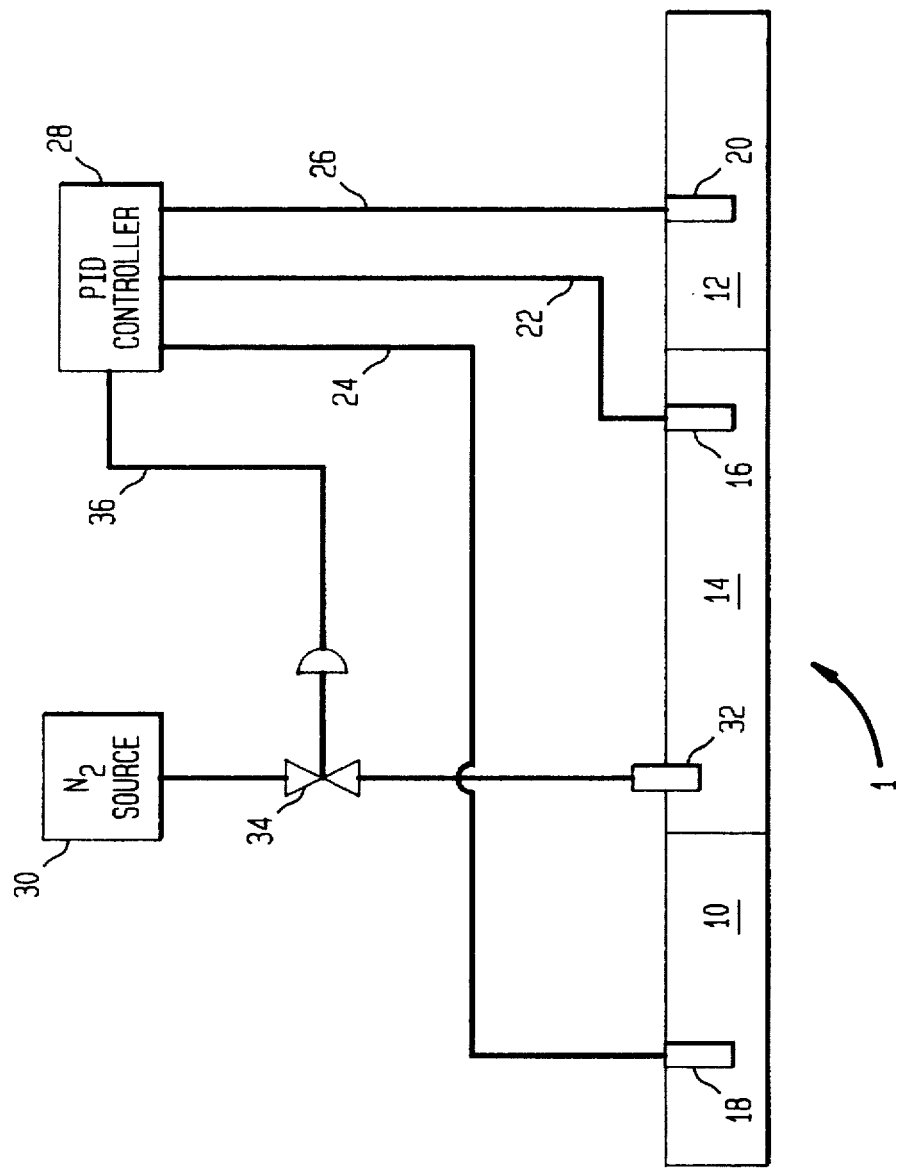

FURNACE HAVING REGULATED FLOW RATE OF INERTING GAS

RELATED APPLICATIONS

This is a continuation-in-part of Ser. No. 08/563,145, Nov. 27, 1995, now abandoned.

BACKGROUND OF THE INVENTION

The present invention relates to furnaces in which articles enter the furnace through an inlet section, are processed within the furnace in a central processing section, and then, after having been processed, pass from the furnace through an outlet section. More particularly, the present invention relates to such a furnace in which the central processing section has one or more inlets for introducing an inerting gas into the furnace to inhibit the ingress of air into the furnace. Still even more particularly, the present invention relates to such a furnace in which the flow rate of the inerting gas is regulated by a controller.

In furnaces, such as reflow and wave soldering furnaces (also known as ovens), muffle furnaces and the like, an inerting gas (usually nitrogen or $N_2$+ oxygen scavenger such as $H_2$, HC) is introduced into the furnace in order to create an oxygen-free processing atmosphere to prevent oxidation of articles consisting of heated metal parts. The flow rate of the inerting gas is set to inhibit air from entering at least the central processing section of the furnace. Air ingress often results from articles moving through inlet and outlet sections of the furnace, leaks within the furnace and air entrapment within articles moving through the furnace.

The extent to which air has entered the central processing section of the furnace can be measured and can be referred to in terms of the resulting oxygen concentration of the furnace atmosphere. The specified oxygen level allowable for a particular process is typically user defined but can be anywhere between 0 and about 100,000 ppm. These limits depend on type of metal, the temperature it is being heated to and the other components of the atmosphere (such as [$H_2$] etc.). Additionally, in soldering and brazing furnaces, the specified oxygen level is based upon such factors as the strength of the flux used in removing oxide layers during soldering, the complexity of the joints being soldered, and the number of joints per part. Lowering the oxygen level lowers joint defect rates, allows for the use of low residue fluxes (which do not need to be cleaned after processing) and results in stronger joints.

Inerting gas flow rates are typically set during installation of the furnace and are set to produce the specified oxygen concentration levels in the processing sections of the furnace. For instance, in a reflow or wave soldering furnace the processing section of interest would be the reflow or wave soldering zone. Once the inerting gas flow rate is set, it is rarely changed, except perhaps marginally, by production personnel. As a result, in order to avoid air ingress problems, the flow rate that is initially set for the furnace has to be somewhat higher than a theoretical minimum flow required to maintain a given oxygen concentration level. The excess flow rate of inerting gas thus provides a safety margin against unforeseen causes of air ingress. As such, there is no attempt made to minimize the flow rate of inerting gas.

One means of maintaining a pre-set oxygen level within a furnace is a closed control loop where the oxygen level at a location of interest is monitored to effect a change in the flow rate of the inerting gas. For instance, the output of an oxygen analyzer can be used to control the flow rate of nitrogen gas being introduced into reflow soldering zone of a reflow soldering fiunace. The problem with this technique is that by the time a change in oxygen level is sensed, too much air ingress has already occurred. As a result, the flow rate of nitrogen is reset at an excessively high level to restore the set point.

As will be discussed, the present invention provides for a furnace in which the flow of inerting gas being introduced into the furnace is optimally controlled in accordance with the present invention.

SUMMARY OF THE INVENTION

The present invention provides a furnace comprising an inlet and outlet sections and a central processing section located between the inlet and outlet sections. The central processing section has at least one inlet for inerting gas to flow into the central processing section and then towards the inlet and outlet sections for at least inhibiting ingress of air into the central processing section. A control means is provided for supplying the inerting gas at a flow rate sufficient to at least inhibit air from entering the central processing section. The control means is responsive to a control signal for controlling the flow rate of the inerting gas. At least first and second sensing means are located within the central processing section and at least one of the inlet and outlet sections, respectively, for generating at least first and second output signals referable to the oxygen concentrations within the central processing section and the at least one of the inlet and the outlet sections. A PID proportional, integral, differential) controller responds to the first, second and third output signals for generating the control signal. The PID controller produces a control signal which is equal to a sum written as $(K_p \epsilon)+(K_1\int\epsilon_1 dt)+(K_2 d\epsilon/dt)$. In the forgoing mentioned sum, $K_p$, $K_1$, and $K_2$ are the proportional, integral and differential gain constants, $\epsilon$ is used for both the proportional and differential error terms, and $\epsilon_1$ is the integral error term. The PID controller can be programmed such that the integral error term is equal to a first time average of the oxygen concentrations of the central processing section less the oxygen concentration set point. Each of the proportional and differential error terms is equal to a second time average of said oxygen concentrations of said central processing section and the at least one of the inlet and outlet sections less said oxygen concentration set point. Preferably each of the first and second time averages is a geometric time average. In this regard, the PID controller will process signals referable to the oxygen concentrations at a rate of about ten times per second, depending of course on the particular sensor used. Therefore if the PID controller is set to average signals over a two second time interval, the signals for each sensor will be summed and then divided by the number of signals for a simple arithmetic average for each of the sensors. In case of a geometric time average a product of all signals will be taken over the time interval and such product will be raised to a power of the inverse of the number of signals.

By using the time average of the concentrations, the system will not over-react to transients occur-ring at the inlet and outlet sections that do not effect the central section. This can be enhanced by programming the PID controller on the basis of geometric time averages. Thus, the PID controller programmed as indicated above will develop a control signal that is more responsive to trends rather than to transient conditions.

BRIEF DESCRIPTION OF THE DRAWING

While the specification concludes with claims distinctly pointing out the subject matter that Applicants regard as their invention, it is believed that the invention will be better understood when taken in connection with the accompanying drawings in which the sole FIGURE is a schematic of a furnace in accordance with the present invention.

DETAILED DESCRIPTION

With reference to the FIGURE, a furnace 1 in accordance with the present invention is illustrated. Furnace 1 can be a continuous furnace or soldering oven. In this regard, the term "furnace" as used herein and in the claims also encompasses an oven.

Furnace 1 has an inlet section 10 and an outlet section 12. A central processing section 14 is located between inlet and outlet sections 10 and 12. Central processing section 14 could be a conventional wave soldering section of an oven. Articles to be heated within furnace 1 enter inlet section 10, proceed to central processing section 14, and pass from furnace 1 through outlet section 12.

First, second and third oxygen sensors, respectively designated by reference numerals 16, 18, and 20, respectively, are provided for sensing oxygen concentrations within central processing section 14, inlet section 10 and outlet section 12. First, second and third oxygen sensors 16, 18 and 20 generate first, second and third output signals which are transmitted by first, second and third electrical connections 22, 24 and 26 to a PID controller 28.

Although not illustrated, as a cost saving measure, one of the second or third oxygen sensor 18 or 20 could be eliminated. In such case, furnace 1 would be run and oxygen concentration readings would be taken in both the inlet and outlet sections 10 and 12. An oxygen sensor would then be located within the section having the highest oxygen concentration reading. Thus, for such embodiment an oxygen sensor would be located in either inlet section 10 or outlet section 12 and therefore there would be only first and second oxygen sensors.

In order to ensure a sufficiently low level of oxygen is maintained within central processing section 14, a nitrogen source 30 is provided which introduces nitrogen through a nitrogen inlet nozzle 32 into central processing section 14. The nitrogen flowing into central processing section 14 in turn flows toward inlet and outlet sections 10 and 20 in order to help prevent air from entering central processing section 14. The flow rate of nitrogen is controlled by a mass flow controller 34 which is in turn controlled by a control signal generated by PID controller 28. The control signal is transmitted to mass flow controller through an electrical connection 36. Although not illustrated, additional nitrogen injection points in for instance, inlet and outlet sections 10 and 12 could be provided (and could be manifolded together with inlet 32 or the $N_2$ flow in such). The nitrogen flow in such additional injection points could be constant and as such no automatic flow control would be provided.

The control signal is generated in response to first, second and third output signals which are in turn generated by oxygen sensors 16, 18 and 20. It is understood these signals need only be referable to the oxygen concentration. Hence, first, second and third oxygen sensors 16, 18 and 20, could be replaced by pressure sensors. Additionally, velocity sensors might be used for the same purpose. These other sensors would develop signals that were referable to oxygen concentration even though they did not sense oxygen concentration directly. More preferably, first oxygen sensor 16 would be of the type to directly sense oxygen concentration and the other two second and third oxygen sensors could be of the type to inferentially sense oxygen concentration through pressure and/or velocity measurements. If only two sensors are used, then, the second of the oxygen sensors could be replaced by a pressure or velocity sensor.

In programming PID controller 28, the desired oxygen concentration must be determined for central processing section 14. For instance, a pre-set oxygen concentration might be specified as no more than 10 parts per million oxygen within central processing section 14. Thereafter, PID controller 28 is programmed so that the proportional and differential error terms are each equal to a time average of the oxygen concentrations of central processing section 14 and inlet and outlet sections 10 and 12 (the oxygen concentrations sensed by first, second and third oxygen concentration sensors 16, 18 and 20) less said oxygen concentration set point. The integral error term is set equal to a time average of the oxygen concentrations of central processing section 14 less the oxygen concentration set point. Although the foregoing averages could be simple arithmetic averages, preferably, the averages are on the basis of a geometric mean. The proportional, integral and differential gain constants are experimentally determined for each particular furnace. The time over which the averages are taken is typically user defined. Furnace length and desired response time are important factors in setting such time. It has thus far been found by the inventors herein that such time will typically vary in a range of between about 0.5 seconds and about 10.0 seconds.

By way of example, an IR reflow oven, 3.285 m. long ×0.74 m. wide and with a maximum board height of 0.12 m. was provided with four gas inlets located 0.2 m., 1.05 m., 2.2 m., and 3.085 m. from the board inlet. A constant flow rate of nitrogen at about 80 liters/min. was introduced into both the first and last gas inlets located at 0.2 m. and 3.085 m., respectively. Additionally, a constant flow rate of nitrogen at about 150 liters/min. was introduced in the second gas inlet located 1.05 m. from the board inlet. Nitrogen supplied to the third gas inlet, located at 2.2 m., was controlled by a mass flow controller. Gas samples were drawn from three locations, namely at 1 m., 2.285 m. and 2.785 m. from the board inlet, using $\frac{1}{16}$ inch stainless steel tubing, to three oxygen analyzers. The proportional, integral, and differential gain constants of 0.5, 0.02 and 0.2 were found to give optimal control in terms of overshoot, offsets and speed of response. The proportional, integral and differential error terms were programmed in the manner outline above and with the relevant time averages to be determined on the basis of geometric time averages over a time period of 2.0 seconds. An oxygen concentration set point of 30 ppm was selected for the central processing section, about 2.285 m. from the board inlet. Under such a set up, an average flow of about 135.3 liters/min. through the mass flow controller was required to maintain the oxygen concentration set point of about 30.0 ppm.

Experiments were ran to demonstrate the advantageous operation of the preferred embodiment of the present invention. For instance, it was found that a constant flow rate of nitrogen supplied at a rate of about 150 liters/min to the third gas inlet was required to maintain the 30.0 ppm oxygen concentration set point. In another experiment, the PID controller was programmed on the basis of an arithmetic time average taken over a time period of 2.0 seconds. In this later experiment an average flow rate of 137.1 liters/min. nitrogen was required to maintain the 30.0 ppm set point.

Although the present invention has been described with reference to preferred embodiment, as will occur to those skilled in the art, numerous additions, changes and omissions can be made without departing from the spirit and scope of the present invention.

We claim:

1. A furnace comprising:

inlet and outlet sections;

a central processing section located between said inlet and outlet sections;

said central processing section having at least one inlet for an inerting gas to flow into said central processing section and then towards said inlet and outlet sections for preventing ingress of air into said central processing section;

control means for supplying said inerting gas to said at least one inlet and at a flow rate sufficient to at least inhibit air from entering said central processing section;

said control means responsive to a control signal for controlling said flow rate of said inerting gas;

at least first and second sensing means located within said central processing section and at least one of said inlet and outlet sections, respectively for generating at least first and second output signals referable to oxygen concentrations within said central processing section and said at least one of said inlet and outlet sections; and a PID controller responsive to said at least first and second output signals for generating said control signal, said PID control programmed such that an integral error term is equal to a first time average of said the oxygen concentrations of said central processing section less an oxygen concentration set point and each of the proportional and differential error terms is equal to a second time average of said oxygen concentrations of said central processing section and said at least one of said inlet and outlet sections less said oxygen concentration set point.

2. The furnace of claim 1, wherein said second sensing means is located within said inlet section and a third sensing means is located within said outlet section.

3. The furnace of claim 1 or claim 2, wherein said fist and second time averages are each a geometric time average.

4. The furnace of claim 1 or claim 2, wherein said second, and third sensing means comprise oxygen sensors.

5. The furnace of claim 1 or claim 2, wherein said second, and third sensing means composed pressure sensors.

6. The furnace of claim 1 or claim 2, wherein said second, and third sensing means comprise velocity sensors.

7. The furnace of claim 1 or claim 2, wherein at least said first sensing means comprises an oxygen sensor.

8. The furnace of claim 7, wherein said first and second time averages are each a geometric time average.

* * * * *